Feb. 14, 1933.  A. A. DA SILVA  1,897,303
SAFETY PROTECTOR FOR OIL BURNERS
Filed Sept. 26, 1932  2 Sheets-Sheet 1

Inventor
Augusto A. Da Silva,

By Clarence A. O'Brien
Attorney

Feb. 14, 1933.  A. A. DA SILVA  1,897,303
SAFETY PROTECTOR FOR OIL BURNERS
Filed Sept. 26, 1932   2 Sheets-Sheet 2
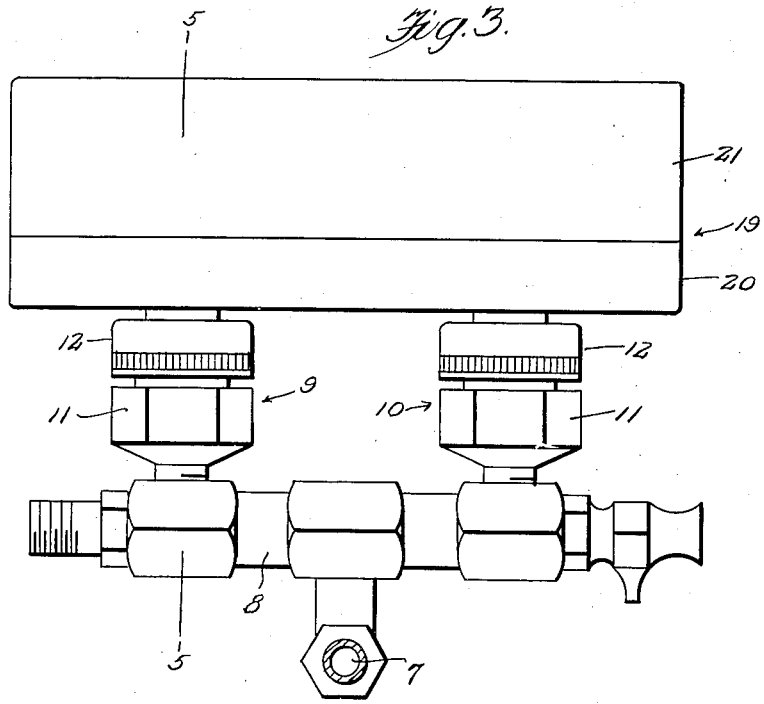
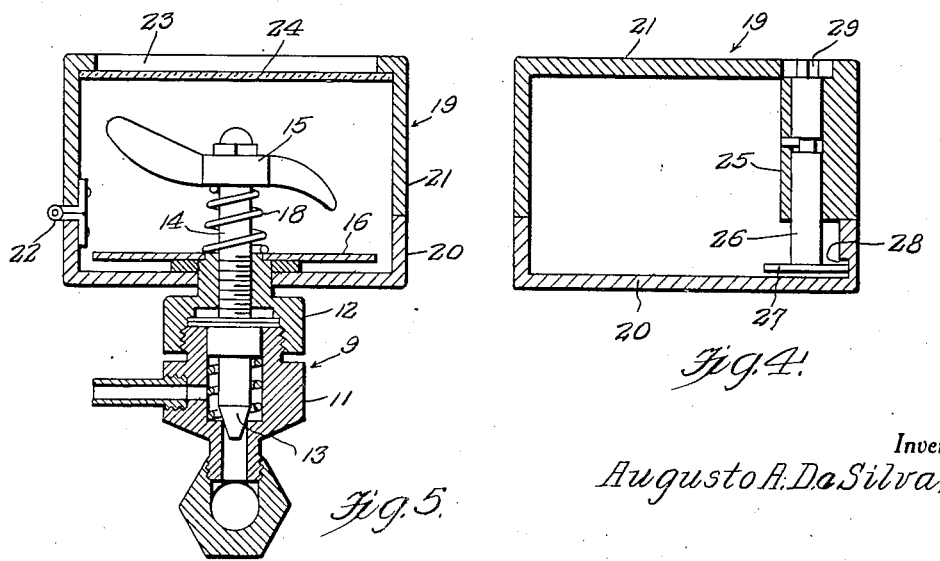
Inventor
Augusto A. DaSilva,
By Clarence A. O'Brien
Attorney Patented Feb. 14, 1933

1,897,303

UNITED STATES PATENT OFFICE

AUGUSTO A. DA SILVA, OF WHITMAN, MASSACHUSETTS

SAFETY PROTECTOR FOR OIL BURNERS

Application filed September 26, 1932. Serial No. 634,935.

This invention relates to an improved safety appliance especially designed for use in connection with the indicator equipped valved feed pipe assembly now used in present-day types of oil burners for controlling the supply of fuel to an ensemble of burners.

In valved pipe assemblies of this particular class, the fuel regulating valves are provided with suitably graduated indicating dials and indicators, the indicators constituting operating handles for regulating the valves. Usually these indicator-handles are exposed and subject to easy displacement thus bringing about dangerous conditions frequently resulting in fire hazards.

The purpose of the present invention is to provide simple and economical arrangements whereby these indicator-handles are completely housed in an appropriate enclosure such as protects and prevents accidental or unauthorized adjustment of the indicator-handles.

The specific structural details and arrangements selected for accomplishing the desired results will become more readily apparent from the following description and drawings.

In the accompanying illustrative drawings, wherein like numerals are employed to designate like parts throughout the same:

Figure 3 is a side elevational view.

Figure 4 is a transverse sectional view taken approximately on the plane of the line 4—4 of Figure 2.

Figure 5 is a view similar to Figure 4, the section being approximately on the line 5—5 of Figure 3.

Figure 1:
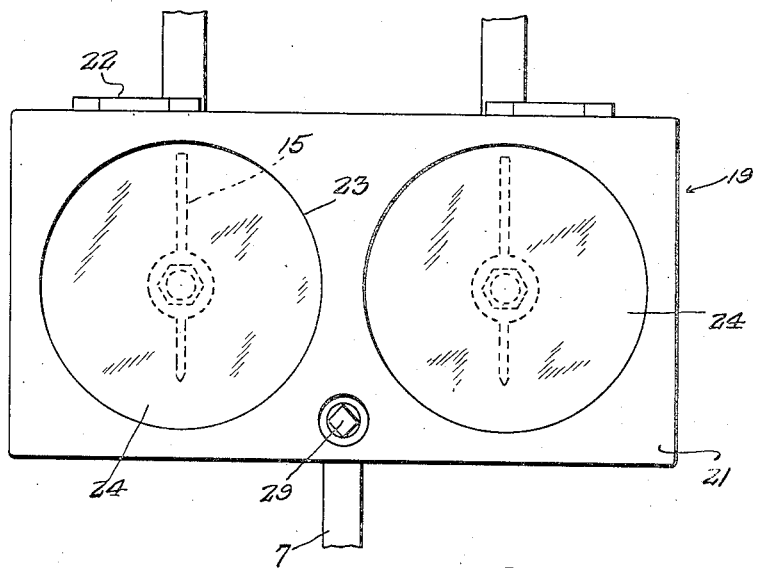
Figure 1 is a top plan view of the salient structural features of the improvement.
Figure 2:
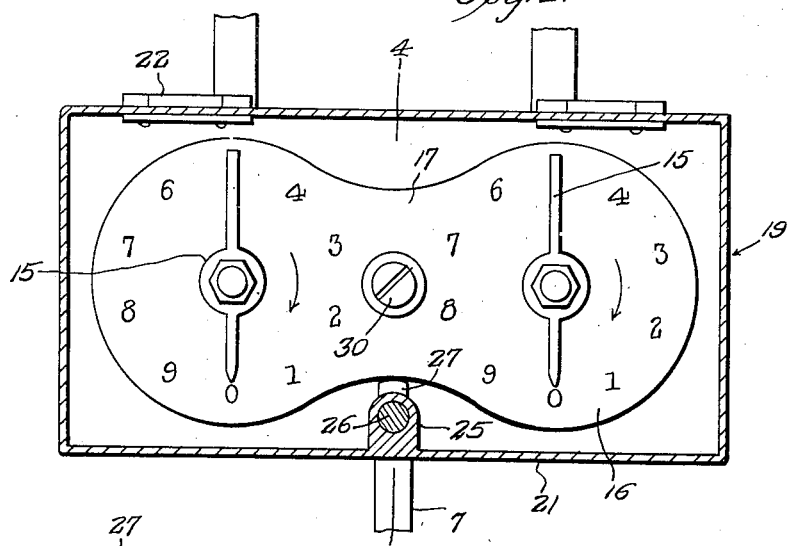
Figure 2 is a horizontal sectional view.
Figure 6:
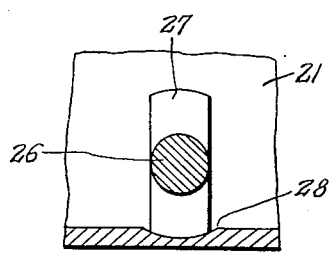
Figure 6 is a detail fragmentary sectional view.

As shown in Figure 3, the valved pipe assembly embodies the main fuel delivery or feed pipe 7 appropriately joined to a distributing pipe 8 to which the valve units 9 and 10 are appropriately connected. Each valve unit embodies a body 11 and a cap 12, the body being fashioned with a valve seat as shown in Figure 5, to accommodate the needle end 13 of the screw valve stem 14. The numerals 15 designate the indicator handles co-operable with the graduations on the dials 16. These dials are formed on a dial plate 17 of the configuration shown in Figure 2. The numerals 18 are merely conventional coiled springs surrounding the valve stems.

The protective casing for the features 15 and 16 is represented as a unit by the numeral 19 and comprises a sheet metal box including a bottom section 20 and a cover section 21 hingedly connected to the section 20 as indicated by hinges at 22. The numerals 23 designate sight openings and 24 glass windows permitting the dials to be inspected from the exterior of the protective box.

The cover section 21 as shown in Figure 4 is provided with a bored boss 25 serving as a bearing for an oscillatory shaft 26 carrying a retaining button or head 27 engageable with a keeper seat 28. The shaft is provided at one end with a polygonal extension 29 to accommodate the key (not shown). The dial plate 17 is secured centrally to the section 20 of the box as indicated at 30 in Figure 2.

The gist of the invention is in the provision of a protective casing or box made up of hingedly connected sections and containing the dial plate 17 and housing the indicators 15. The locking or fastening means for the box may be of various constructions, the type illustrated in Figure 4 being preferred. The idea is to guard and protect the indicators 15 to prevent accidental improper adjustment thereof such as frequently happens when the indicators are completely exposed and unprotected. By providing the sight openings 23 and windows 24 the dial may be readily inspected from the interior so that it is convenient to regulate the valve stems 14 whenever necessary or desired.

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. In a structure of the class described, a valved pipe assembly comprising a fuel delivery pipe, a distributing pipe connected thereto, valve units connected to said distributing pipe, valve stems incorporated in said valve units, each valve stem being provided with an indicator, a box-like protective casing formed in its bottom with openings, adjacent portions of the valve units extending through said openings into the casing, a dial plate connected with said valve units and confined in said casing, said indicators being co-operable with the dials.

2. In a structure of the class described, a valved pipe assembly comprising a fuel delivery pipe, a distributing pipe connected thereto, valve units connected to said distributing pipe, valve stems incorporated in said valve units, each valve stem being provided with an indicator, a box like protective casing formed in its bottom with openings, adjacent portions of the valve units extending through said openings into the casing, a dial plate connected with said valve units and confined in said casing, said indicators being co-operable with the dials, said casing embodying hingedly connected sections, one section being formed with sight openings and adjacent transparent windows, and fastening means for securing the sections of the casing together.

In testimony wherof I affix my signature.

AUGUSTO A. DA SILVA.